United States Patent [19]

Overthun et al.

[11] Patent Number: 5,669,722
[45] Date of Patent: Sep. 23, 1997

[54] COMPUTER KEYBOARD SUPPORT MECHANISM

[75] Inventors: Thomas Overthun, San Francisco; Shigetoshi Amano, Sunnyvale; Masahiko Kawauchi; J. Scott Petermann, both of San Jose, all of Calif.

[73] Assignee: Alps Electric (U.S.A.), Inc., San Jose, Calif.

[21] Appl. No.: 631,770

[22] Filed: Apr. 10, 1996

[51] Int. Cl.⁶ ............................................. B41J 5/08
[52] U.S. Cl. ..................... 400/489; 400/472; 248/918
[58] Field of Search ......................... 400/489, 472; 248/918, 919, 349.1, 133, 184.1, 637

[56] References Cited

U.S. PATENT DOCUMENTS

| | | | |
|---|---|---|---|
| 5,209,446 | 5/1993 | Kawai | 248/349 |
| 5,228,791 | 7/1993 | Fort | 400/489 |
| 5,302,040 | 4/1994 | Louis | 400/489 |
| 5,393,150 | 2/1995 | Fort | 400/489 |
| 5,454,652 | 10/1995 | Huellemeier et al. | 400/489 |

*Primary Examiner*—Edgar S. Burr
*Assistant Examiner*—Dave A. Ghatt
*Attorney, Agent, or Firm*—Guy W. Shoup; Patrick T. Bever

[57] ABSTRACT

A bifurcated computer keyboard including separated keyboard segments adjustably mounted on supports. The supports include an upper wall which is inclined relative to a supporting surface. The keyboard segments include beveled protrusions which are rotatably mounted on the upper wall of the supports. The keyboard segments are adjusted to a desired tilt (side to side) angle by rotating the supports relative to the keyboard segments. A retaining member is provided to maintain the keyboard segments at a predetermined spacing.

9 Claims, 8 Drawing Sheets

COMPUTER KEYBOARD SUPPORT MECHANISM

BACKGROUND OF THE INVENTION

1. Field of the Invention

The present invention is directed to an adjustable computer keyboard, and more particularly to a bifurcated keyboard having segments mounted on low-cost support members.

2. Description of the Prior Art

Conventional keyboards include keys which are arranged in straight rows on a single base structure. These keyboards have been criticized as being incompatible with the physiological structure of the human hand, wrist and arm because, in order to operate these keyboards, a user's hands must be misaligned (turned outward) relative to longitudinal axes of the user's forearms. This misalignment has been blamed for musculoskeletal injuries such as carpal tunnel syndrome.

Bifurcated keyboards were developed to address the incompatibility associated with conventional keyboards. Bifurcated keyboards include two or more separate keyboard segments respectively arranged for manipulation by the right and left hands of a user. Each segment is turned outward such that the rows of keys are perpendicular to the longitudinal axes of a user's forearms, thereby allowing the user's hands to remain aligned with the user's forearms, and thereby reducing discomfort and potential injury associated with conventional keyboards.

Several bifurcated keyboard arrangements are currently-known.

A first prior art bifurcated keyboard arrangement is disclosed in U.S. Pat. No. 5,454,652 to Huellmeier et al. Huellmeier et al.'s keyboard includes two (right and left) segments connected at respective back corners by a connector. The connector includes a first socket integrally formed on the right segment, a second socket integrally formed on the left segment, and a ball held between the first and second segments by a metal shaft. Relative movement between the two segments is performed by loosening a knob connected to the shaft and pivoting the right and left segments about the connector. In this way, the front edges of the right and left segments can be pivoted outward relative to each other. Further, Huellmeier et al.'s keyboard includes a plurality of adjustable legs mounted on lower surfaces of each of the right and left segments. These adjustable legs may be manipulated to adjust the slope angle (front to back) and tilt angle (side to side) of the segments relative to, for example, a desk surface. The combination of the connector and pivotable supports allows a user to adjust the keyboard into a comfortable position.

A problem with the bifurcated keyboard of Huellmeier et al. is that the connector and supports are complicated and expensive to produce and assemble. As mentioned above, the connector is made up of several molded pieces and requires a metal shaft to hold the pieces together. Further, there are three pivotable supports mounted on each keyboard segments, each support requiring a bracket and a pair of nested legs. The total cost of manufacturing the keyboard is increased significantly by the costs of these pieces and by the time required to assemble the keyboard segments.

A second type of bifurcated keyboard is disclosed in U.S. Pat. No. 5,228,791 to Fort. Fort discloses a keyboard formed in two segments with each segment being separately mounted on a support through a ball and socket joint.

Fort's keyboard suffers from the same problems associated with Huellmeier et al.'s keyboard (discussed above); namely, that the ball and socket joint includes several pieces which are expensive to produce and assemble.

SUMMARY OF THE INVENTION

In accordance with the present invention, a bifurcated keyboard is provided in which keyboard segments are rotatably mounted on inclined (wedge-shaped) supports. An operating angle of each keyboard segment relative to a user is adjustable by rotating the supports relative to the keyboard segments. With this structure, a low-cost bifurcated keyboard is provided which includes many of the ergonomic benefits of more expensive prior art bifurcated keyboards.

In accordance with one aspect of the present invention, the support is a molded plastic disk having a lower peripheral edge defining a first plane, and an upper peripheral edge defining a second plane which is inclined relative to the first plane to form an acute angle. The lower peripheral edge of each support rests on, for example, a desk-top surface, and the upper peripheral edge is attached to a lower surface of one of the keyboard segments. With this structure, the keyboard segments are adjustable to align a user's hands with the axes of his/her forearms by rotating the supports and keyboard segments together, and the slope angle (front to back) and tilt angle (side to side) of the keyboard segments are adjustable by rotating the keyboard segments relative to the supports. This allows ergonomic positioning of the keyboard segments without the need for the expensive and complicated mechanisms used in the prior art.

In accordance with another aspect of the present invention, each support includes an upper surface, and a disk-like beveled protrusion is formed on a lower surface of each keyboard segment. The beveled protrusion is coaxially joined to the upper surface of each support such that a lower surface of each beveled protrusion is supported by the upper surface of one of the supports. When each keyboard segment is adjusted into a reference position, a thinnest portion of the beveled protrusion is substantially aligned with a thickest portion of the support such that the tilt angle of each keyboard segment is minimized (for example, 0°). As the keyboard segments are rotated from the reference positions, a thickest portion of each beveled protrusion is moved toward the thickest portion of the supports, thereby causing the tilt angle to gradually increase toward a maximum tilt angle.

In accordance with yet another aspect of the present invention, a flat retaining member is provided for maintaining the keyboard segments at a predetermined distance. The retaining member includes a frame defining openings for receiving the supports. The openings of the retaining member are spaced apart by the predetermined distance. A plurality of teeth are provided on an inner edge of the openings to prevent unwanted rotation of the keyboard segments.

BRIEF DESCRIPTION OF THE DRAWINGS

These and other features, aspects and advantages of the present invention will become better understood with regard to the following description, appending claims and accompanying drawings, where:

DESCRIPTION OF THE PREFERRED EMBODIMENT

Figure 1:
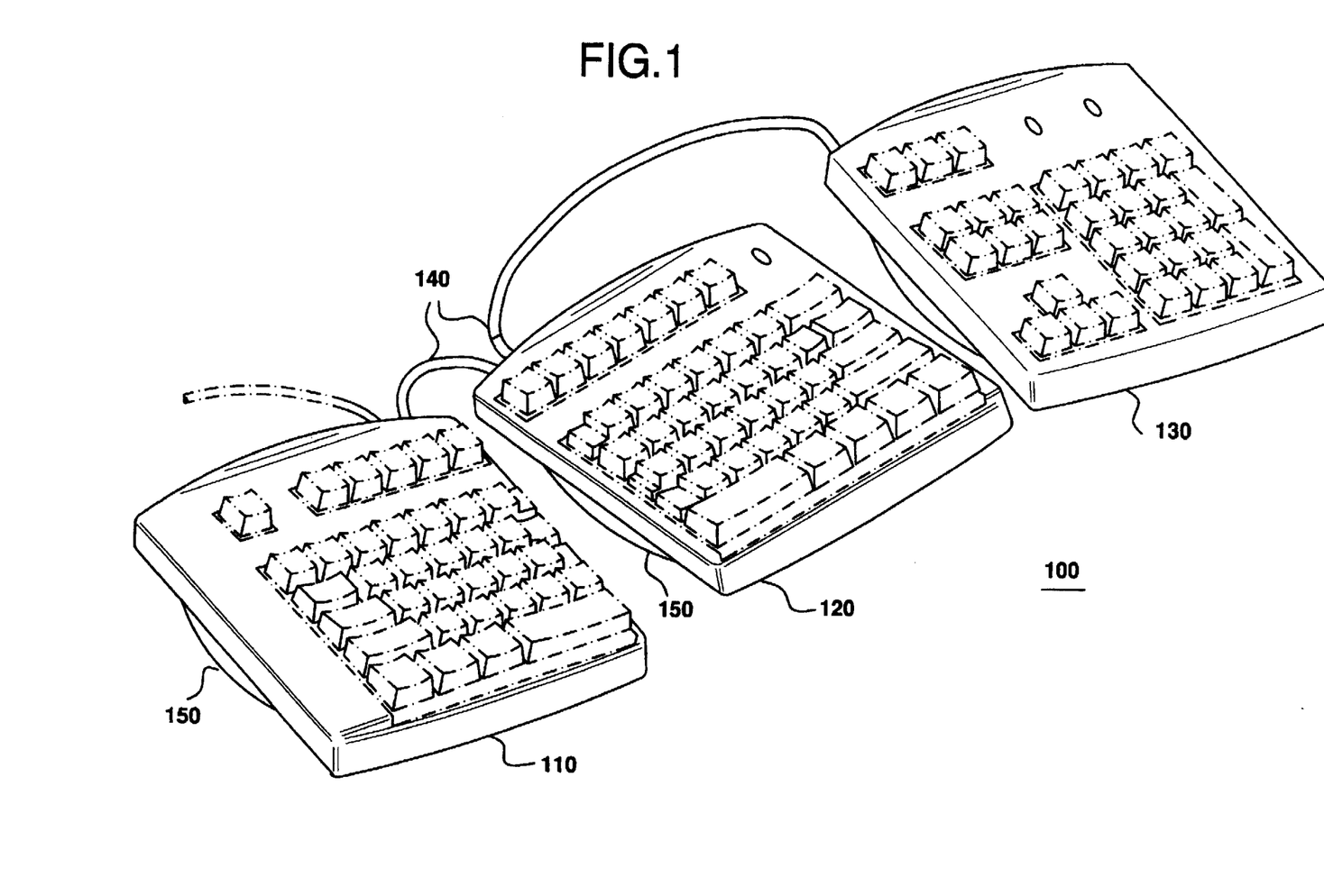
FIG. 1 is a perspective view showing a bifurcated keyboard according to the present invention.

Referring to FIG. 1, a bifurcated keyboard 100 in accordance with the present invention includes a left keyboard segment 110, a right keyboard segment 120 and a numerical keypad segment 130, all of which include housings formed from molded plastic. The keyboard segments 110 and 120 and keypad segment 130 are interconnected by a cable 140 which transmits keyboard output signals to, for example, a personal computer (not shown). The left segment 110 and the right segment 120 are adjustably mounted on supports 150 (discussed below). The left segment 110 and right segment 120 combine to provide a standard QWERTY keyboard arrangement, and the keypad segment 130 includes a standard numerical keypad. Of course, other key arrangements may be used.

Figure 2A:
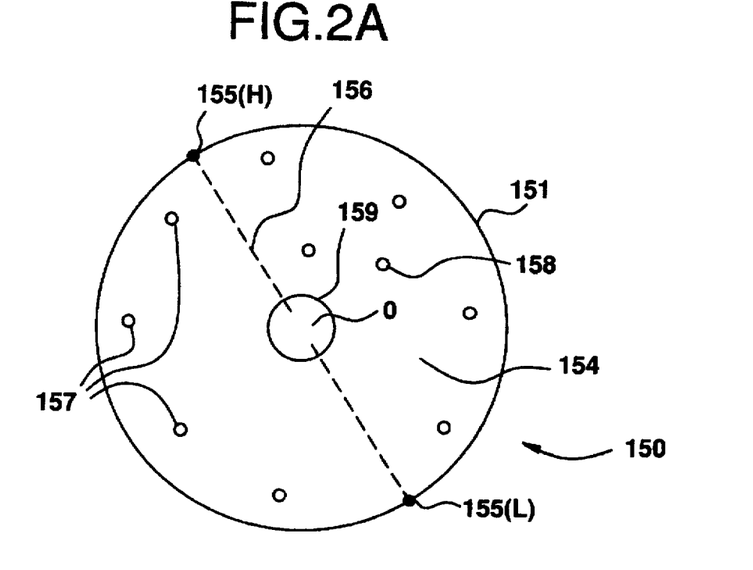
FIGS. 2(a), 2(b) and 2(c) are top plan, front elevation and side elevation views, respectively, of a keyboard support of the present invention.
Figure 2B:
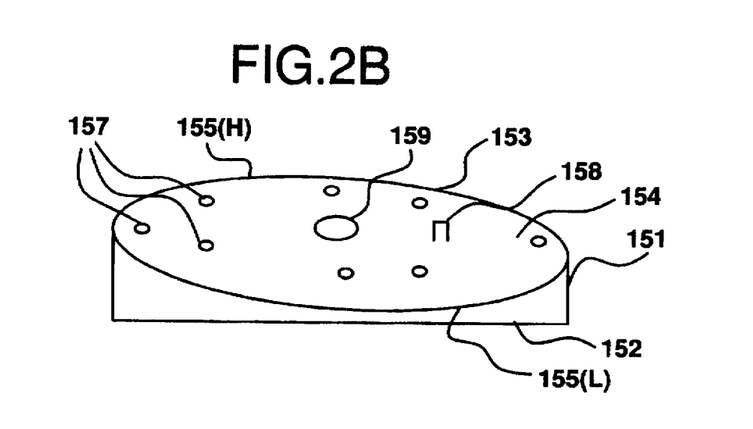
Figure 2C:
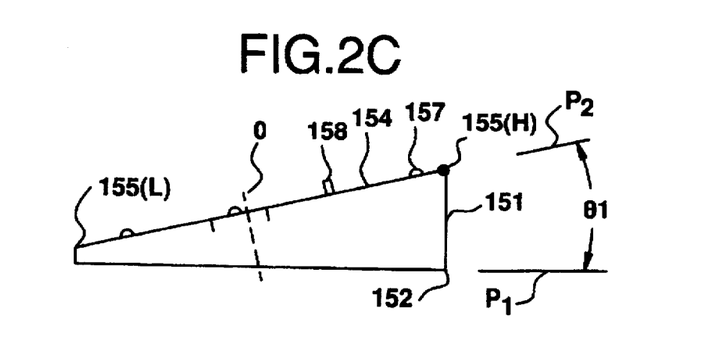

FIGS. 2(a), 2(b) and 2(c) show top, front and side views, respectively, of the support 150 according to one embodiment of the present invention. The support 150 is preferably formed from molded plastic and includes a substantially cylindrical outer wall 151 having a lower peripheral edge 152 and an upper peripheral edge 153. An upper wall 154 is formed across the upper peripheral edge 153.

AS shown in FIG. 2(c), the upper wall 154 of each support 150 is inclined relative to the lower peripheral edge 152. The upper peripheral edge 153 includes a thinnest portion (low point) 155(L) and a thickest portion (high point) 155(H). The thinnest portion 155(L) is defined as the point on the upper peripheral edge 153 which is closest to the lower peripheral edge 152, and the thickest portion 155(H) is the point on the upper peripheral edge 153 which is furthest from the lower peripheral edge 152. An imaginary bisector 156 is indicated as a straight dashed line between the thinnest portion 155(L) and the thickest portion 155(H). The upper peripheral edge 153 also defines a first plane P1 which is substantially perpendicular to a central axis 0. The lower peripheral edge 152 defines a second plane P2 which forms an angle θ1 with the first plane P1 which is preferably in the range of 2° to 10°, and most preferably 7°.

As shown in FIGS. 2(a) and 2(b), a plurality of raised bumps 157 and a guide projection 158 extend from the upper wall 154 of each support 150. Further, a central opening 159 is formed in the upper wall 154.

Figure 3A:
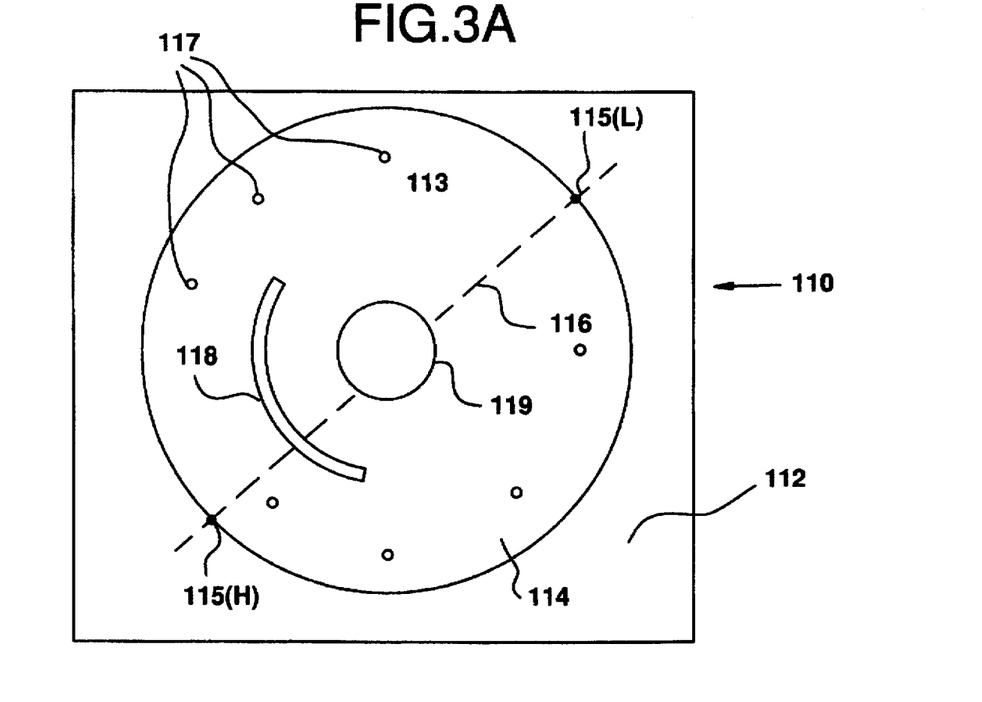
FIGS. 3(a) and 3(b) are bottom plan and front elevation views, respectively, of a keyboard segment of the present invention.
Figure 3B:
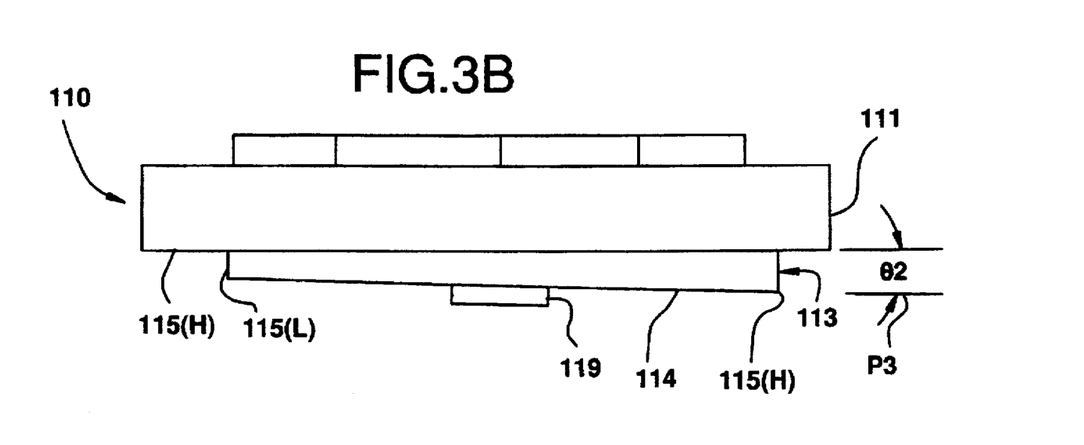

FIGS. 3(a) and 3(b) show bottom and front views, respectively, of the left keyboard segment 110. The right keyboard segment 120 includes a substantially mirror image structure in relation to the left segment 110. Therefore, a detailed description of the right segment 120 is omitted.

The left keyboard segment 110 is preferably a molded plastic member including a keypad 111 having a lower wall 112, and a disk-like beveled protrusion 113 extending downward from the lower wall 112. A diameter of the beveled protrusion 113 is substantially equal to an outer diameter of the support 150. The beveled protrusion 113 includes a lower surface 114.

As shown in FIG. 3(b), the lower surface 114 of the beveled protrusion 113 is inclined relative to the lower wall 112 of the keyboard segment 110. The outer peripheral edge of the lower surface 114 includes a thinnest portion (low point) 115(L) and a thickest portion (high point) 115(H). The thinnest portion 115 (L) is defined as the point on the outer peripheral edge of the beveled protrusion 113 which is closest to the lower wall 112, and the thickest portion 115(H) is the point on the outer peripheral edge which is furthest from the lower wall 112. An imaginary bisector 116 is indicated by the straight dashed line extending between the thinnest portion 115 (L) and the thickest portion 115(H). The bisector 116 of the left keyboard segment 110, and a corresponding bisector 126 of the right segment 120, are used below in association with the bisectors 156 of the supports 150 for explaining the minimum and maximum tilt positions of the keyboard segments. The lower surface 114 also defines a third plane P3 which is substantially coincident with the second plane P2 when the segment 150 is attached to the left keyboard segment 110. The third plane P3 forms an angle θ2 with respect to the lower wall 112 of the left segment 110 which is preferably in the range of 1° to 5°, and most preferably 2°

As shown in FIGS. 3(a) and 3(b), a plurality of divots 117 and a guide groove 118 are formed in the lower surface 114 of the left segments 110. Finally, a cylinder member 119 extends from the lower surface 114 of the beveled protrusion 111 which is used to connect the left keyboard segment 110 to the support 150. When connected together, the guide projection 158 slides within the guide groove 118 to limit the rotating range of the left segment 110 relative to the support 150.

Figure 4:
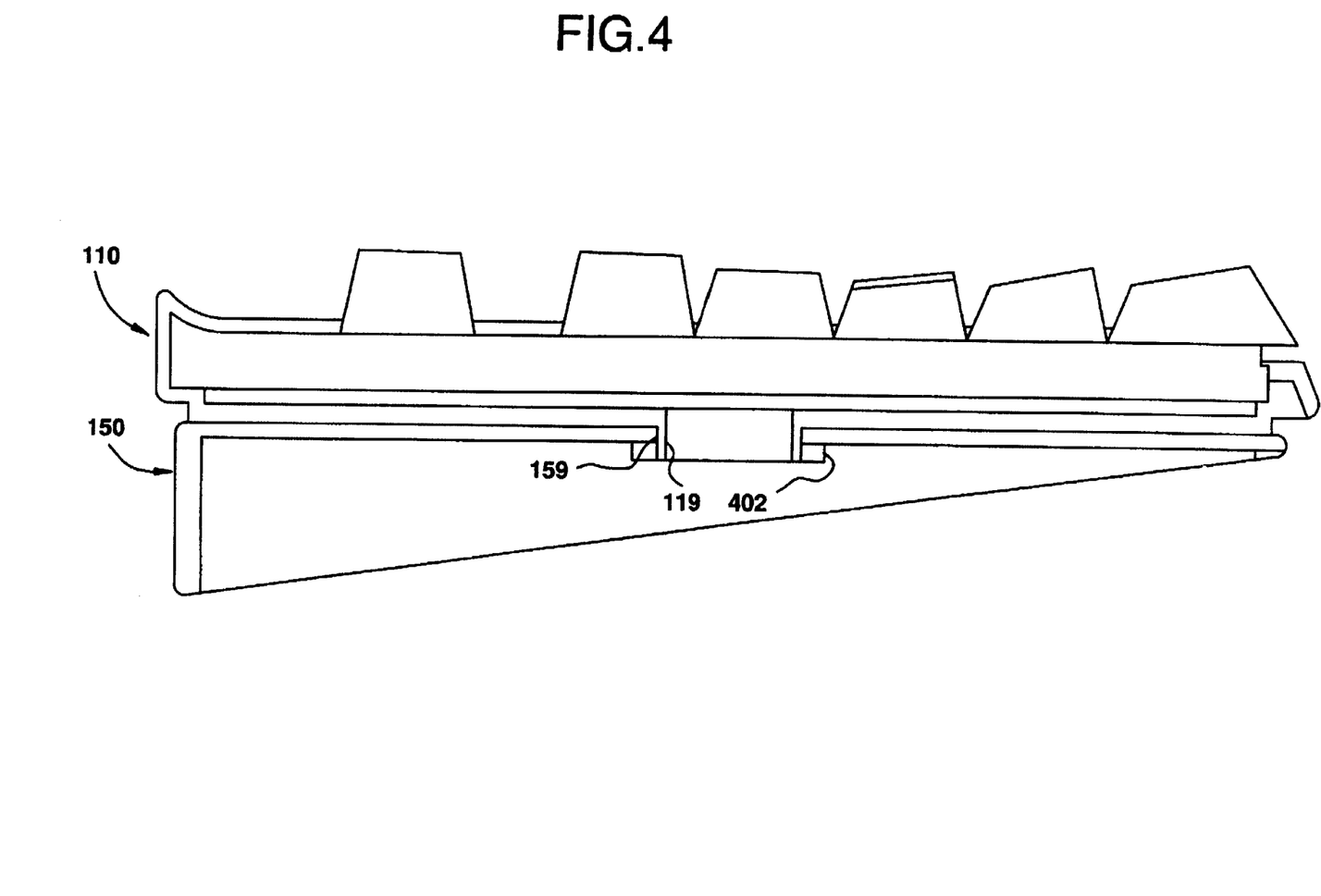
FIG. 4 is a sectional view showing a keyboard segment connected to a support of the present invention.

FIG. 4 is a sectional view showing a preferred method of connecting the left keyboard segment 110 to the support 150. As shown, the threaded cylinder 119 extends through the opening 159 of the support 150, and is secured using a fastener 402, such as nut. The fastener 402 biases the support 150 toward the left keyboard segment 110 such that, in specific positions, the bumps 157 enter the divots 117 to prevent undesired rotation of the left segment 110 relative to the support 150 after adjustment, and to provide a "click" feeling when the support 150 is rotated relative to the left segment 110.

Figure 5A:
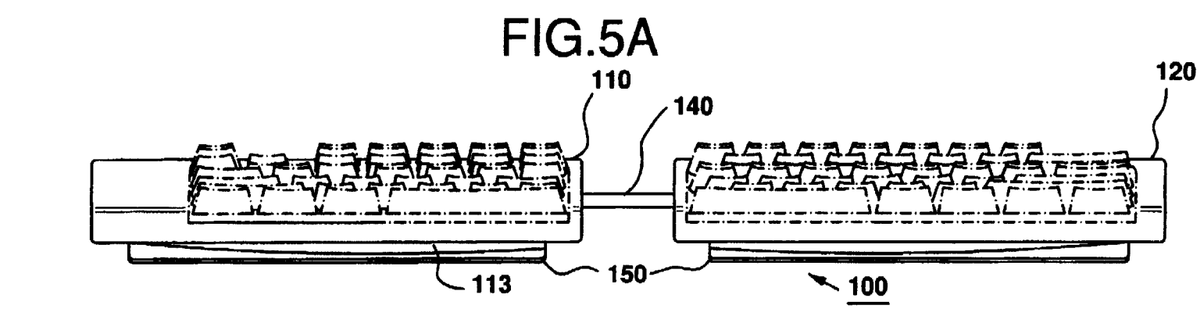
FIGS. 5(a), 5(b) and 5(c) are front elevation, top plan, and side elevation views, respectively, of two keyboard segments of the bifurcated keyboard in a reference position.
Figure 5B:
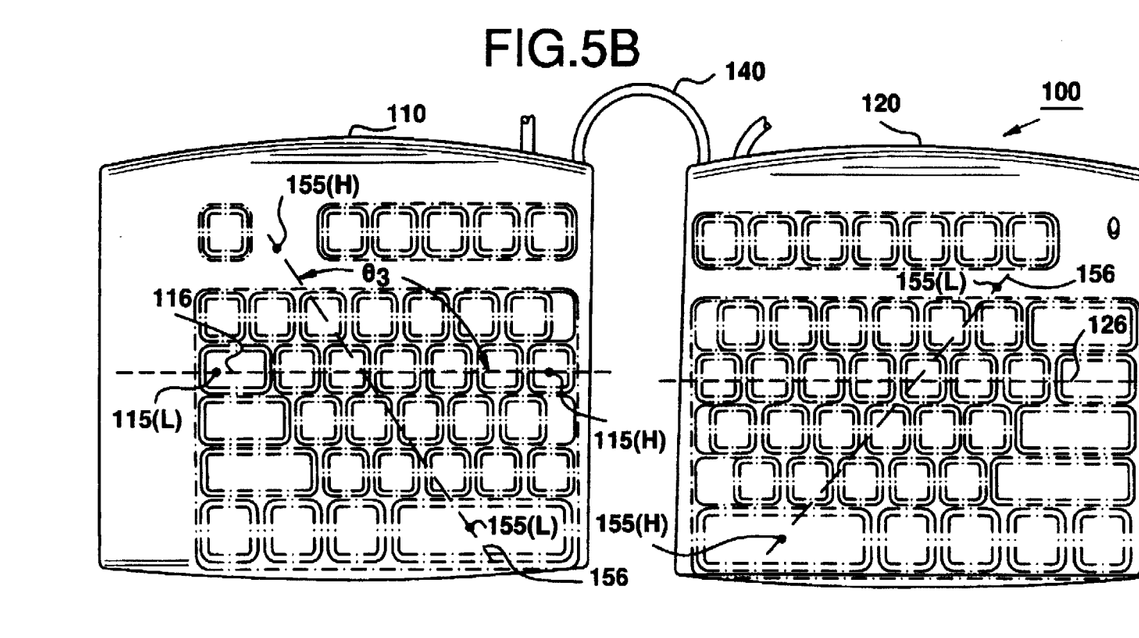
Figure 5C:
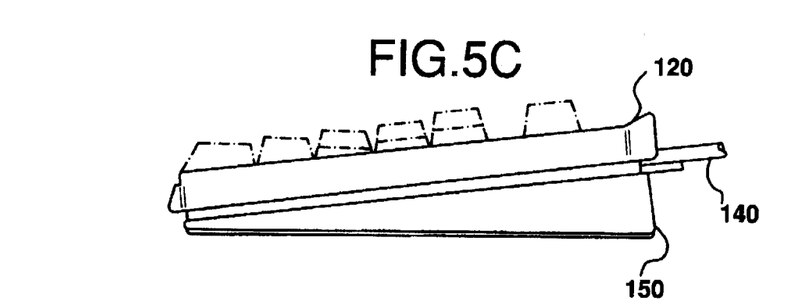

FIGS. 5(a), 5(b) and 5(c) show front, top and side views, respectively, of the keyboard 100 in a reference position. As shown in these figures, in the reference position the bisector 116 of the left keyboard segment intersects the bisector 156 at an angle θ3 of approximately 120°. In the reference position, the thinnest portion 115 (L) is relatively close to the thickest portion 155(H), and the thickest portion 115(H) is relatively close to the thinnest portion 155(L). The right keyboard segment 120 is adjusted in a similar manner. In the reference positions, the upper surfaces of the segments 110 and 120 have a substantially 0° tilt angle.

Figure 6:
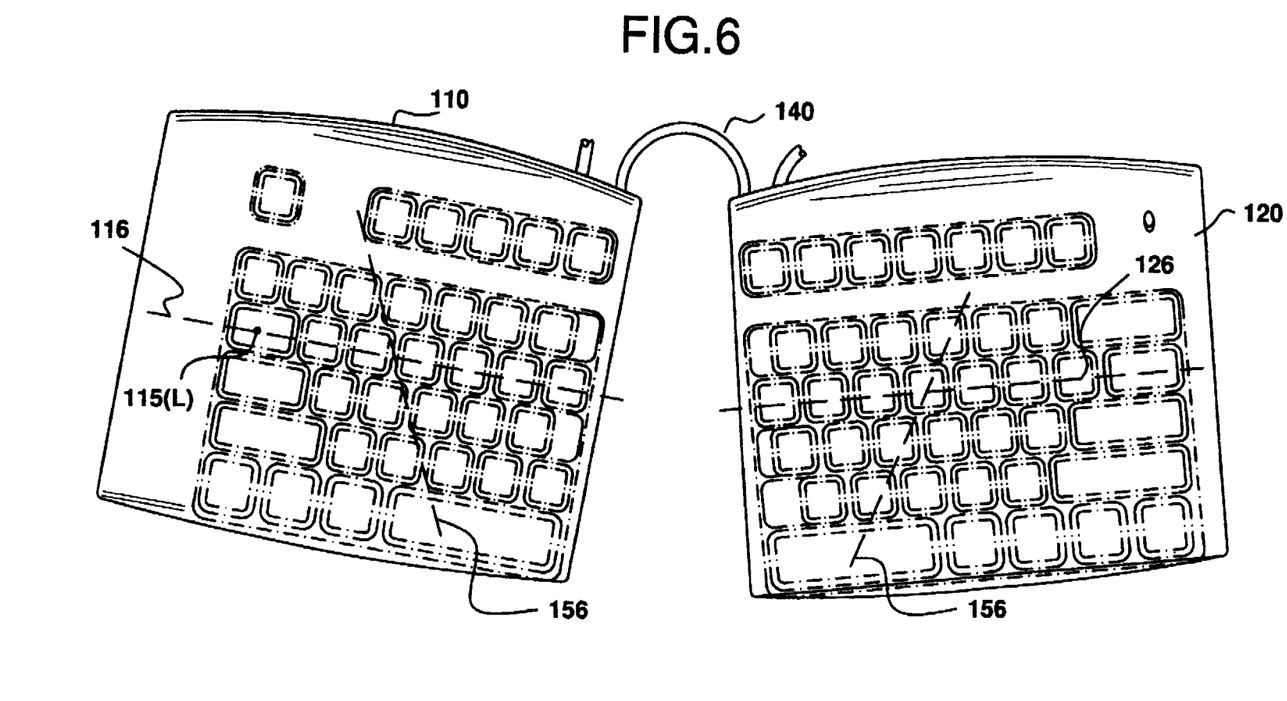
FIG. 6 is a top plan view of two segments of the bifurcated keyboard with the segments turned outward.

FIG. 6 illustrates the keyboard 100 rotated into an ergonomic position such that the keyboard segments 110 and 120 are aligned with a user's forearms. In particular, the left keyboard segment 110 is rotated clockwise and the right keyboard segment 120 is rotated counterclockwise from the reference position shown in FIG. 5(b). To effect this adjustment, the right keyboard segment 110 and left keyboard segment 120 are rotated with their respective supports 150. With this adjustment, the relative angles between the bisectors 156 of the supports 150 and the bisectors 116 and 126 of the left and right keyboard segments 110 and 120 are the same as in the reference position shown in FIG. 5(b). However, the bisectors 116 and 156 associate with the left keyboard segment 110 are rotated clockwise from the reference position, and the bisectors 126 and 156 associated with the right keyboard segment 120 are rotated counterclockwise. The adjustment shown in FIG. 6 does not change the tilt angle of the keyboard segments.

Figure 7A:
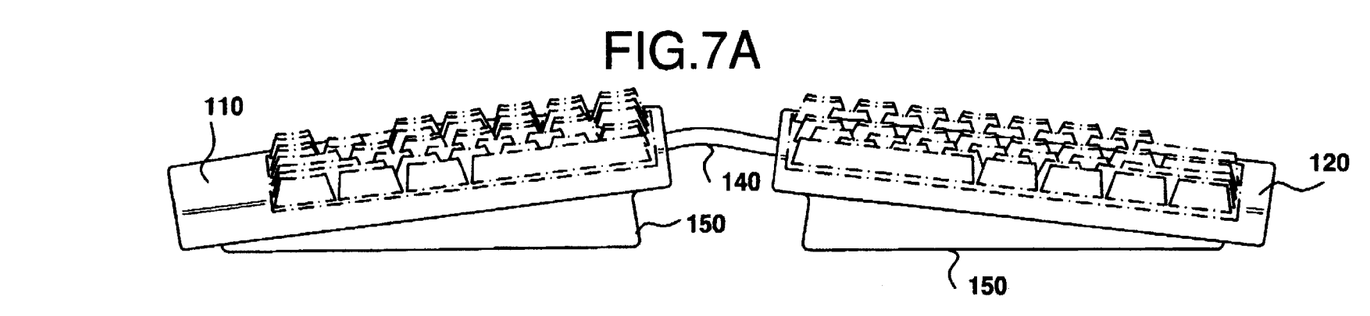
FIGS. 7(a) and 7(b) are front elevation and top plan views, respectively, of two segments of the bifurcated keyboard with the segments tilted outward.
Figure 7B:
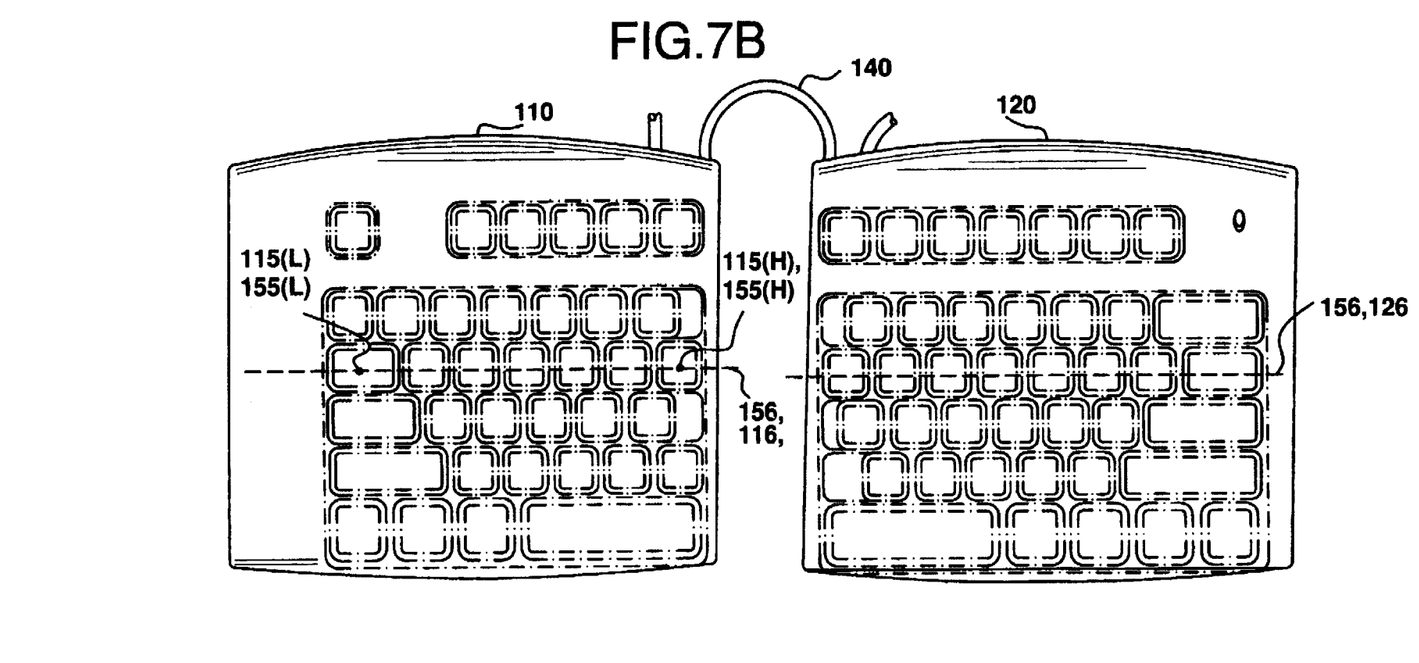

FIGS. 7(a) and 7(b) are front and top views illustrating a maximum tilt angle adjustment of the keyboard 100 in accordance with the present invention. As shown in FIG. 7(b), tilt angle adjustment is implemented by rotating the supports 150 through an angle of approximately 120° relative to the right keyboard segment 110 and the left keyboard segment 120 such that the bisectors 156 of the supports 150 are aligned with the bisectors 116 and 126 of the left and right keyboard segments 110 and 120. In the maximum tilt angle position, the thickest portion 155(H) of the supports 150 and the thickest portion 115(H) of left keyboard segment are stacked substantially on top of each other. As shown in FIG. 7(a), this adjustment causes the right keyboard segment 110 and left keyboard segment 120 to tilt such that these segments form an "A" shape. Note that, in comparison with the reference position, the tilted position shown in FIGS. 7(a) and 7(b) provide maximum tilt angle of approximately 9°.

In accordance with the present invention, it is also possible to rotate the supports 150 relative to the right and left segments 110 and 120 to a point between the reference position shown in FIG. 5(a) and the maximum tilt angle position shown in FIG. 7(a). For example, the supports 150 may be rotated to an intermediate point which produces a tilt angle of, for example, 4.5°.

Figure 8:
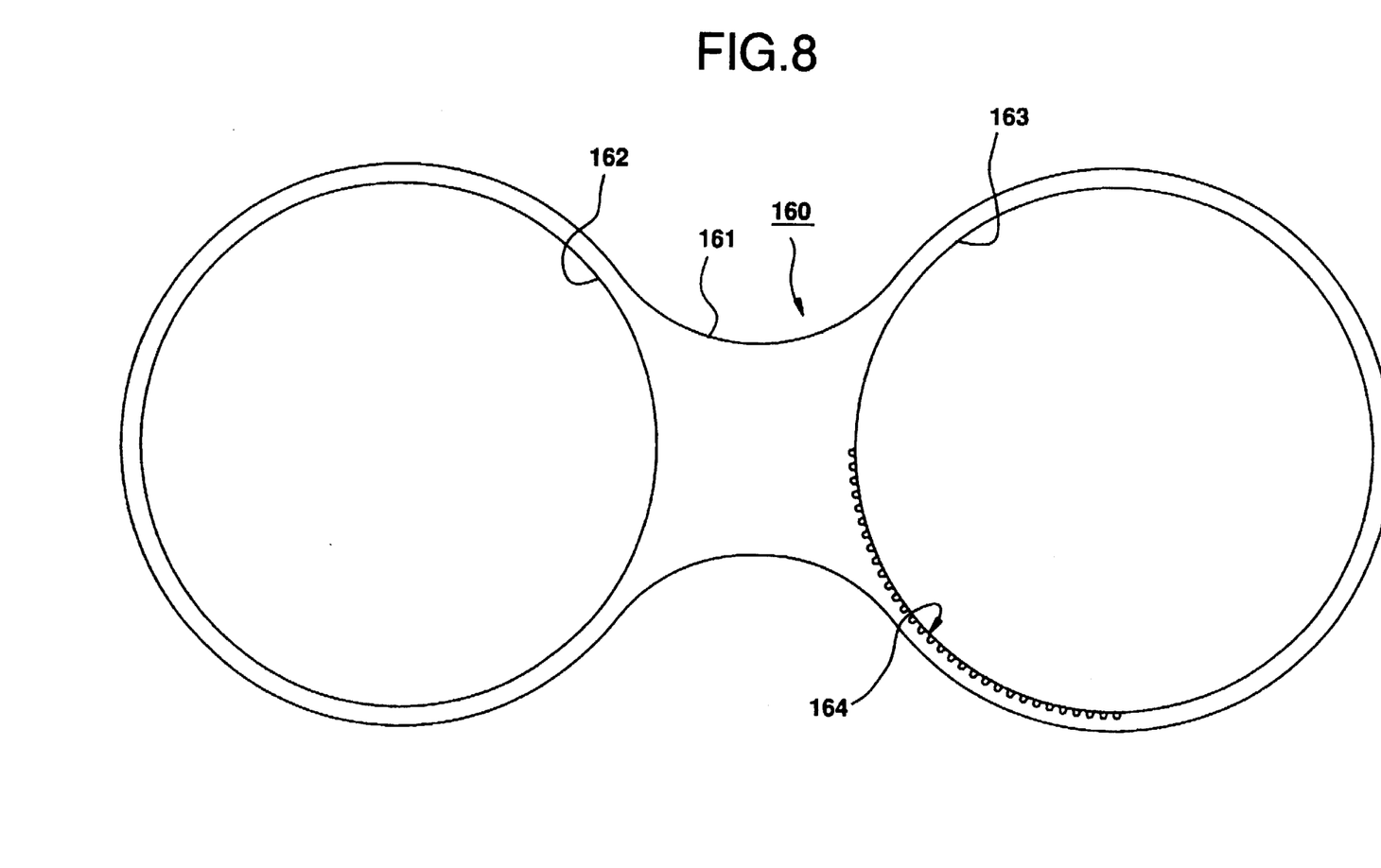
FIG. 8 is a top view of a support retaining member including openings for receiving the keyboard supports of the present invention.

In accordance with the preferred embodiment, as shown in FIG. 8, a flat molded plastic retaining member 160 includes a frame 161 formed in a "FIG. 8" shape. The frame 161 defines openings 162 and 163 for receiving the lower peripheral edges 154 of the supports 150. The openings 162 and 163 of the retaining member 160 are spaced apart such that a distance between the left and right keyboard segments remains constant during use. Further, as shown in FIG. 8, a plurality of teeth 164 are optionally formed on the inner surface of the openings 162 and 163 for frictional engagement with the outer walls 151 of the supports 150 to impede rotation of the keyboard segments 110 and 120.

Although the invention is described herein with reference to the embodiments shown in FIGS. 1–8, one skilled in the art will readily appreciate that other structures may be substituted for those set forth herein without departing from the spirit and scope of the present invention. For example, the upper wall 154 of the support 150 may be omitted and the upper peripheral edge 153 may be received within an annular groove formed in the lower wall 112 of the left keyboard segment 110. In another alternative embodiment, the cylindrical outer wall 151 may be replaced with, for example, a conically-shaped wall. Further, the angle θ1 formed by the planes P1 and P2 (see FIG. 2) of the support 150 is not limited to the range of 2° to 10°—the angle θ1 may be selected from the range of 1° to 45°. Similarly, the angle θ2 is not limited to the range of 1° to 5°. Alternative support retaining members are also possible. For example, a member may be provided with projections which are received in openings defined by the lower peripheral edges 152 of the supports 150. In addition, a spring may be used to bias the supports against the left and right keyboard segments. In view of the above-mentioned modifications, the invention should only be limited by the claims included below.

We claim:

1. A bifurcated keyboard comprising:
    first and second supports, each support including an outer wall having a lower edge defining a first plane and an upper wall defining a second plane, the second plane intersecting the first plane at an acute angle; and
    first and second keyboard segments respectively rotatably mounted on the first and second supports, each of the first and second keyboard portions including a disk-shaped beveled protrusion having a lower surface slidably mounted on the upper wall of one of the supports.

2. The bifurcated keyboard of claim 1, wherein the lower surface of each beveled protrusion defines a guide groove, and wherein each support includes a guide projection received in the guide groove of one of the first and second keyboard segments.

3. The bifurcated keyboard of claim 1, further comprising a retaining member having openings for receiving the first and second supports, the openings being spaced apart such that the first and second keyboard segments are maintained at a predetermined distance.

4. A bifurcated keyboard comprising:
    first and second disk-shaped supports, each support including a cylindrical wall having a lower edge defining a first plane, an upper wall defining a second plane, the first and second planes intersecting at an angle; and
    first and second keyboard segments respectively rotatably mounted on the first and second supports, each of the first and second keyboard portions including a disk-shaped beveled protrusion having a lower surface slidably mounted on the upper wall of one of the supports.

5. The bifurcated keyboard of claim 4, wherein the lower surface of each beveled protrusion defines a guide groove, and wherein each support includes a guide projection received in the guide groove of one of the first and second keyboard segments.

6. The bifurcated keyboard of claim 4, further comprising a retaining member having openings for receiving the first and second supports, the openings being spaced apart such that the first and second keyboard segments are maintained at a predetermined distance.

7. A bifurcated keyboard comprising:
    first and second supports, each support including substantially cylindrical outer wall having a lower edge defining a first plane, an upper wall defining a second plane, the first and second planes intersecting at an angle; and
    first and second keyboard segments, each of the first and second keyboard portions including a keypad, a lower wall formed under the keypad, and a disk-shaped beveled protrusion fixedly mounted to the lower wall, the beveled protrusion having a lower surface defining a third plane, the lower wall defining a fourth plane which intersects with the third plane at a second angle, the lower surface of each keyboard segment being rotatably mounted on the upper wall of one of the first and second supports such that the second and third planes are substantially coincident.

8. The bifurcated keyboard of claim 7, wherein the lower surface of each beveled protrusion defines a guide groove, and wherein each support includes a guide projection received in the guide groove of one of the first and second keyboard segments.

9. The bifurcated keyboard of claim 7, further comprising a retaining member having openings for receiving the first and second supports, the openings being spaced apart such that the first and second keyboard segments are maintained at a predetermined distance.

* * * * *